3,605,790
SPHERE LAUNCHERS
Keith Ellis Hunter, North Anston, near Sheffield, England, assignor to General Descaling Company Limited, Worksop, Nottinghamshire, England
Filed Nov. 10, 1969, Ser. No. 875,105
Claims priority, application Great Britain, Nov. 12, 1968, 53,590/68
Int. Cl. F17d 3/02
U.S. Cl. 137—268        4 Claims

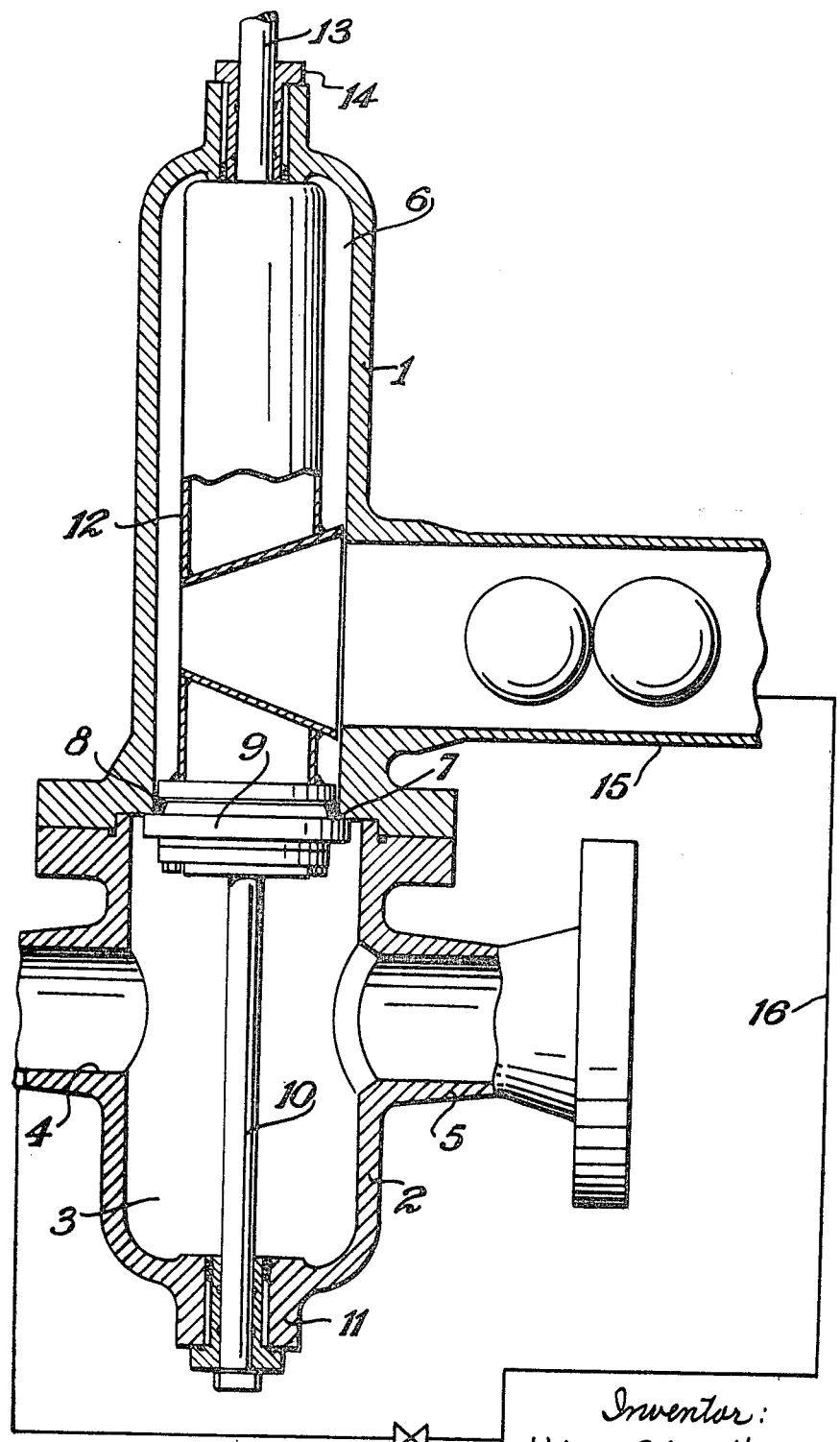

ABSTRACT OF THE DISCLOSURE

A pipeline sphere launcher or receiver is described in which a launching or receiving carriage is movable in an elongated chamber transverse to the pipe into which a sphere is to be launched between a first position in which it receives or discharges a sphere from or to a radially extending chamber, and a second position in which the sphere is launched into or received from the pipeline by means of the flow therethrough, the carriage being supported by stems passing through glands in the ends of the elongated chamber and supporting a valve member which closes off the carriage and the radially extending chamber from the pipeline when the carriage is in its first position.

---

This invention relates to the launching and receiving of pipeline spheres.

The object of the invention is to provide a sphere launcher or receiver which will permit positive launching of spheres or receiving and is particularly well adapted to operation under very high pressures, whilst allowing spheres to be inserted into the apparatus for launching without interrupting flow in the pipeline.

According to the invention, a sphere launcher or receiver comprises a section of pipeline for incorporation in the line into which spheres are to be launched, a body defining an elongated chamber intersecting said pipeline section, a peripheral valve seat defined by said body in said chamber to one side of said intersection and adapted to receive in sealing relation a valve member movable from said seat across said intersection, a launching cage carried by said valve member for movement through said valve seat to a position in which a sphere situated in said cage is on the axis of said pipeline section, means for introducing a sphere into said cage when said valve member is seated, and means to actuate said valve member, said launching cage permitting the entry or exit thereto of a sphere in a direction perpendicular to its line of motion.

A preferred embodiment of the invention is described with reference to the drawing accompanying the provisional specification, showing a sphere launcher in cross section.

The launcher comprises a body formed in two parts 1, 2, bolted together to define a generally cylindrical pressure chamber. The portion 3 of the chamber defined by the lower part 2 of the body is intersected by the common axis of flanged entry and exit conduits 4, 5, forming a section of pipeline for incorporation in the line into which the spheres are to be launched.

The upper portion 6 of the chamber, which is defined by body part 1, has a somewhat smaller diameter than portion 3 of the chamber (although larger than that of the conduits 4, 5). The lower end (as shown) of this body portion is internally bevelled to form a frusto-conical valve seat 7 which cooperates with a seal 8 carried by a valve member 9, which in turn is carried by a stem 10 passing through a seal 11 in the base of body part 2. The valve member can thus be moved from a position in contact with the seat 7, across the common axis of the conduits 4, 5 to a position in the bottom of portion 3 of the chamber.

Carried on top of the valve member 9 is a launching cage 12 comprising a cage structure adapted to receive or discharge a sphere, from or to the right as shown in the drawing, whilst restraining it from movement relative to the cage in a vertical direction. A further stem 13 is connected to the top of the cage 12 and passes through a seal 14 in the top of body portion 1.

When the valve member is in its upper position, the cage 12 is positioned to receive a sphere from a cylindrical loading chamber 15, which may be of sufficient length to accommodate any desired number of spheres and which opens into the body part 1 opposite the cage when the valve is in its upper position. A releasable closure is provided at its outer end for the insertion of spheres. A valved bypass pipe 16 is provided from the upstream end of the launcher (the entry conduit 4) to the outer end of the chamber 15.

In use, and assuming the pipeline to be in use and the valve member 9 to be in its closed position, the valve in the bypass is closed and a desired number of spheres is loaded into the chamber 15 after its closure has been removed. The pressure differential across the valve member 9 will keep the latter firmly closed. The closure is then replaced and the bypass valve opened, thus equalizing the pressure on either side of the valve member 9. The valve member 9 is then operated by actuatiing one or both of the stems 10, 13: the provision of twin opposed stems ensures that under high pressures there are no surfaces present on which differential forces can act so as to prevent free motion of the valve member. As the valve member 9 leaves the seat 7, material from the pipeline passes therethrough via the bypass pipe and the chamber 15 and moves a sphere into the cage 12.

As the valve continues to open, the cage, with this sphere, passes down through the valve seat 7 until the sphere is on the axis of the conduits 4, 5, wherein the flow of material therethrough launches the sphere into conduit 5. The valve member may then be closed again and the cycle repeated as desired.

The construction which has been described is suitable for the launching of spheres. If a device according to the invention is to be used for the receiving of spheres, account must be taken of the fact that where the fluid in the pipeline carrying a sphere is flowing at a high rate, the sphere will enter the cage at a considerable velocity, and the cage 12, the stems 10 and 13 and the seals 11 and 14 must be capable of withstanding the shock loadings imposed as the sphere is brought to rest. Thus a device built for sphere launching will not necessarily be suitable for receiving spheres, and a sphere receiver will need to be of more robust construction than a launcher although otherwise generally as described above. The operation of a sphere receiver according to the invention is the exact reverse of that described for the launcher.

What we claim is:

1. A sphere launcher or receiver comprising a section of pipeline for incorporation in the line into which spheres are to be launched, a body defining an elongated chamber intersecting said pipeline section, a peripheral valve seat defined by said body in said chamber to one side of said intersection and dividing said chamber into two portions, a poppet valve member normally engaging said valve seat to relatively seal said chamber portions and being movable from said seat across said intersection, a launching cage normally sealed within that chamber portion disposed remote from said intersection and being carried by said valve member for movement through said valve seat to a position in which a sphere situated in said cage is on the axis of said pipeline section, means for introducing a sphere into said cage when said valve member is seated, and means to actuate said valve member to move said launching cage from its retracted position into general alignment with said pipeline section, said launching cage permitting the entry or exit thereto of a sphere in a direction perpendicular to its line of motion.

2. A sphere launcher or receiver as claimed in claim 1, wherein the launching cage and valve member are supported for movement by stems extending through either end of the elongated chamber.

3. A sphere launcher or receiver as claimed in claim 2 wherein the means for introducing a sphere into the launching cage comprises a cylindrical loading tube opening at one end into the elongated chamber opposite the position of the cage when the valve member is seated, the other end of the loading tube being connected to the pipeline section upstream of the elongated chamber.

4. A sphere launcher or receiver as claimed in claim 1 wherein the means for introducing a sphere into the launching cage comprises a cylindrical loading tube opening at one end into the elongated chamber opposite the position of the cage when the valve member is seated, the other end of the loading tube being connected to the pipeline section upstream of the elongated chamber.

References Cited

UNITED STATES PATENTS

| | | | |
|---|---|---|---|
| 3,063,079 | 11/1962 | Bergman et al. | 137—268X |
| 3,063,080 | 11/1962 | Bergman et al. | 137—268X |
| 3,146,477 | 9/1964 | Bergman et al. | 137—268X |
| 3,246,666 | 4/1966 | Park III et al. | 137—268 |

M. CARY NELSON, Primary Examiner

R. J. MILLER, Assistant Examiner